Figure 1:
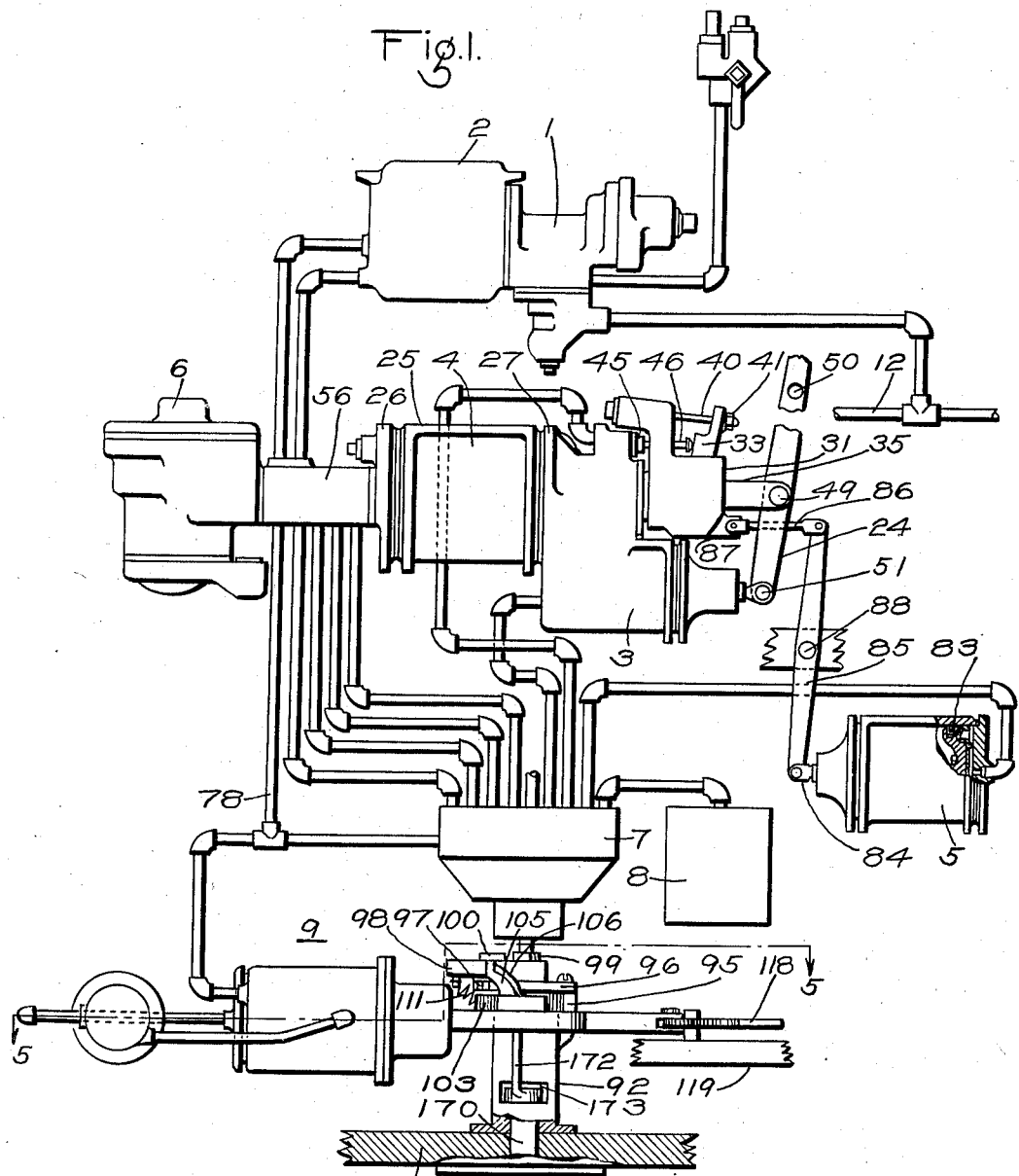

March 26, 1940.  W. E. DEAN, JR  2,194,742
EMPTY AND LOAD BRAKE
Filed Dec. 6, 1934  3 Sheets-Sheet 1

INVENTOR
WILLIAM E. DEAN JR.(DECEASED)
DORIS BROWN DEAN, EXECUTRIX
BY Wm. H. Cady
ATTORNEY

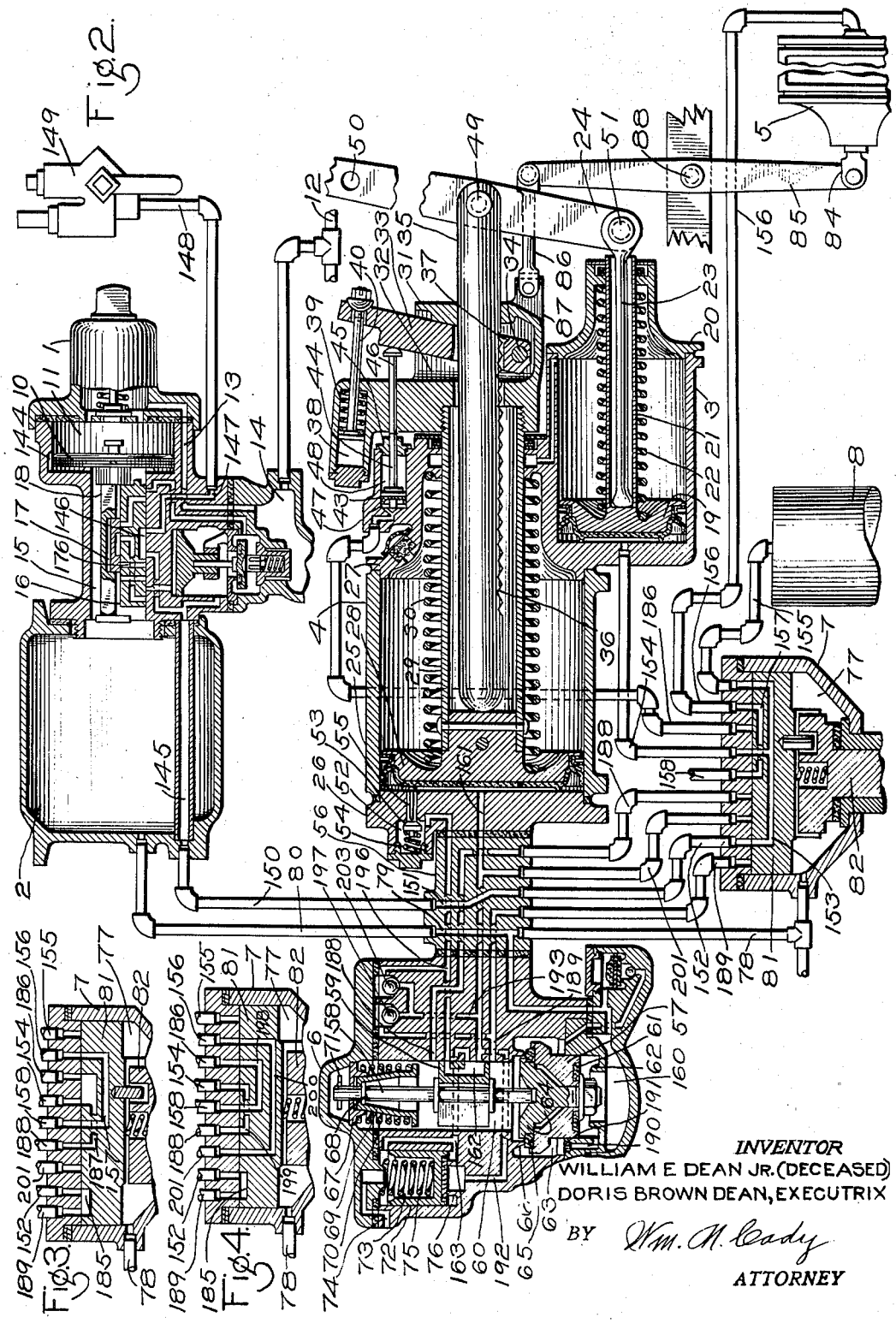

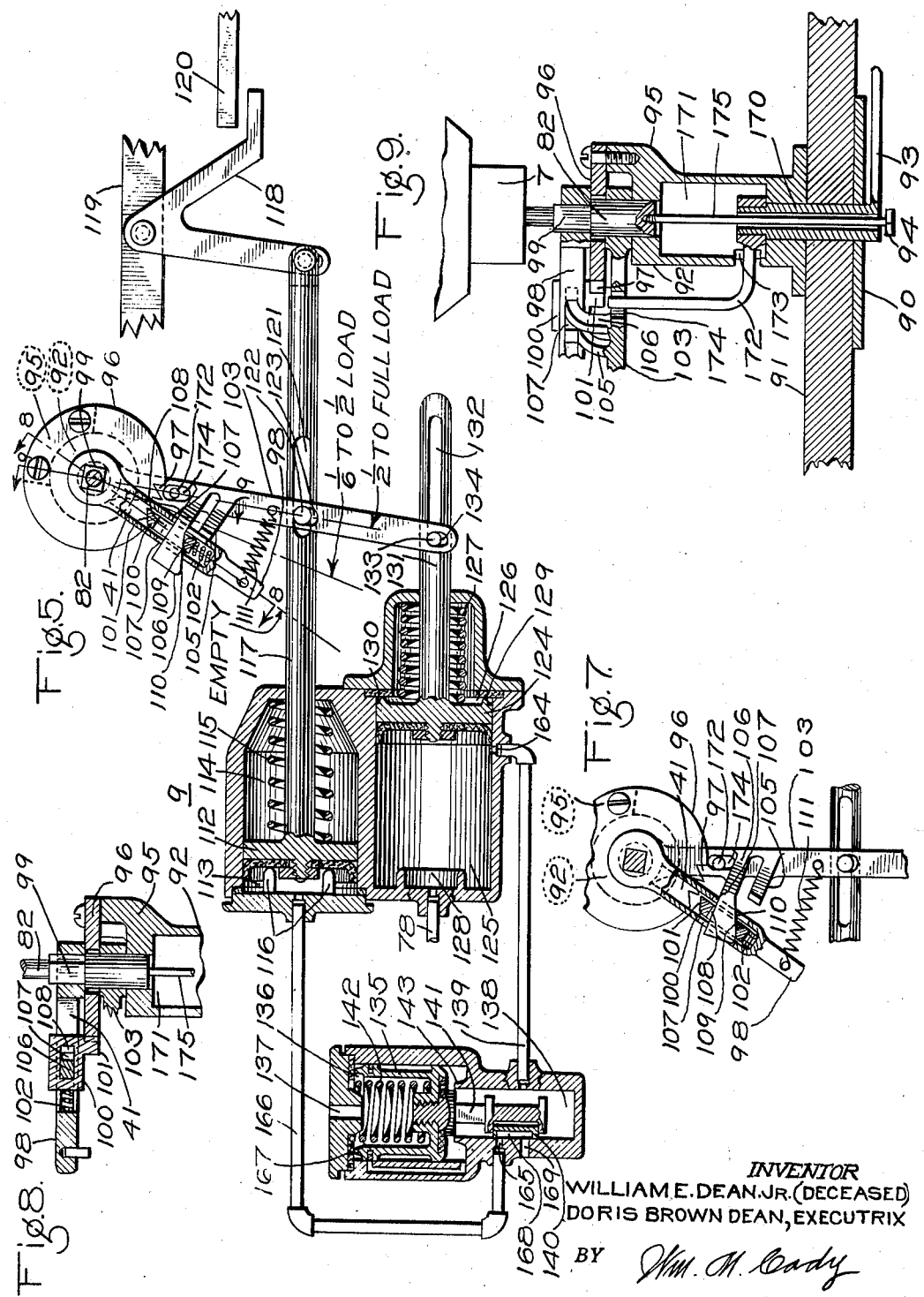

Patented Mar. 26, 1940

2,194,742

UNITED STATES PATENT OFFICE 2,194,742

EMPTY AND LOAD BRAKE

William E. Dean, Jr., deceased, late of Hamilton, Ontario, Canada, by Doris Brown Dean, executrix, Chautauqua, N. Y., assignor to The Westinghouse Air Brake Company, Wilmerding, Pa., a corporation of Pennsylvania Application December 6, 1934, Serial No. 756,232

47 Claims. (Cl. 303—23)

This invention relates to fluid pressure brakes and more particularly to the type adapted to operate upon a reduction in brake pipe pressure to effect an application of the brakes and upon an increase in brake pipe pressure to effect a release of the brakes.

In the design of single capacity freight brake systems, that is, brake systems including only one brake cylinder, it has been customary to employ a brake cylinder of such diameter as to provide a braking force, that is, pressure of brake shoes against the car wheels, equal to a certain percentage of the empty weight of the car, and with the car loaded, this braking force would be equal to a much lower percentage of the weight of car plus the load. For instance, in case the brake cylinder is of such size as to provide a braking force equal to 60% of the empty weight of the car, and the car is adapted to carry a load three times its weight, then such braking force would be equivalent to only 15% of the car plus load, and it will therefore be evident that the car when loaded will not be braked as effectively and can not therefore be stopped as quickly as when the car is empty.

In order to avoid the great difference in braking force, such as from 60% to 15%, when a car is empty and when loaded, it has heretofore been proposed to employ an empty and load brake in which an additional brake cylinder is cut into action when the car is loaded, and while such has resulted in reducing the range of braking force, it has generally necessitated an increase in the amount of stored fluid under pressure on each car of a train with the attendant difficulties of obtaining this increased amount of fluid under pressure throughout a train and the consequent slowing down in the speed of handling the brakes on the train.

One object of the invention is to provide an improved empty and load brake system adapted to provide a range in braking force for all degrees of car loading from empty to full load, which is less than heretofore attained with empty and load brake systems of the type above described.

Another object of the invention is to provide an improved empty and load brake system of the type above described adapted to function with an auxiliary reservoir of the same size as would be employed in connection with a single capacity brake equipment for the same car.

In explanation of the manner of attainment of the above objects, take, for example, a car, which according to single capacity brake practice, would be braked over a range from 60% to 15% according to the degree of load. According to the invention, a braking system is provided which includes three brake cylinders of such size that, with a brake rigging providing a certain calculated leverage between the cylinders and brake shoes, and with means for cutting into action either one, two, or the three brake cylinders, according to the degree of car lading, the braking force on the car will be maintained within a much smaller range, such as between 30% and 50%, than has heretofore been possible with conventional two cylinder empty and load brake systems, and in connection with these three brake cylinders, the same size auxiliary reservoir is employed as would be used on the car in connection with a single capacity brake system.

Another object of the invention is to provide improved means for automatically adjusting the empty and load brake equipment to act in accordance with the degree of car lading.

Other objects and advantages will be apparent from the following, more detailed description of the invention.

Figure 6:
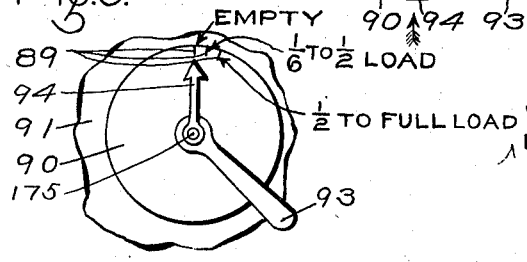

In the accompanying drawings: Fig. 1 is a diagrammatic view, mainly in outline, of a fluid pressure brake equipment embodying the invention; Fig. 2 is an enlarged, diagrammatic view, mainly in section, of a portion of the fluid pressure brake equipment shown in Fig. 1 and showing a load change-over valve in empty position; Figs. 3 and 4 are diagrammatic views of the load change-over valve shown in Fig. 2 but showing the rotary valve in different load positions; Fig. 5 is an enlarged, diagrammatic view, mainly in section, of the load change-over valve automatic adjusting means taken on the line 5—5 of Fig. 1; Fig. 6 is a side elevational view, looking in the direction of arrow 6 in Fig. 1, of the load brake manual adjusting means adapted to be located on the side of the car; Fig. 7 is a view of a portion of the apparatus shown in Fig. 5 with certain parts shown in a different position; Fig. 8 is a sectional view taken on the line 8—8 of Fig. 5; and Fig. 9 is a sectional view taken on the line 9—9 of Fig. 5.

As shown in Fig. 1 of the drawings, the fluid pressure brake equipment comprises a triple valve device 1, an auxiliary reservoir 2, a combined empty brake cylinder and slack take-up cylinder 3, a primary load brake cylinder 4, an auxiliary load brake cylinder 5, a transfer valve device 6, a load change-over valve device 7, a compensating reservoir 8, and automatic change-over valve adjusting means indicated generally by the reference character 9 in Figs. 1 and 5.

The triple valve device 1 is of the usual construction comprising a casing containing a piston 10 having at one side a chamber 11 in constant communication with the usual brake pipe 12 through a passage 13 and chamber 14, and having at the opposite side a valve chamber 15 in constant communication with the auxiliary reservoir 2. A main slide valve 16 and an auxiliary slide valve 17 are contained in the valve chamber 15, and a stem 18 carried by piston 10 in chamber 15 is provided for operating said slide valves.

The combined empty brake cylinder and slack take-up cylinder 3 comprises a casing having a bore closed at one end and open at the opposite end and containing a piston 19. The open end of the bore is closed by a non-pressure head 20 and the piston 19 is provided with a hollow piston rod 21 which extends through a suitable bore in said non-pressure head. A return spring 22 surrounding the piston rod 21 is interposed between the piston 19 and non-pressure head 20 for moving said piston to the brake release position shown in the drawings. A push rod 23 is disposed within the piston rod 21, the outer end of said push rod being pivotally connected to a pin 51 in one end of a brake lever 24.

The primary load brake cylinder 4 comprises a cylinder body 25, a pressure head 26 secured to one end of said body and a non-pressure head 27 secured to the other end of said body, it being noted that the non-pressure head 27 and the casing of the empty brake cylinder 3 are preferably formed integrally. A brake cylinder piston 28 is disposed in the cylinder body 25 and is provided with a hollow piston rod 29 which slidably extends through a suitable bore in the end of the non-pressure head 27. A return spring 30 surrounding the piston rod 29 is interposed between the piston 28 and a wall of the non-pressure head for urging said piston to the brake release position shown in the drawings.

A clutch or latch device 31 is secured to the end of the piston rod 29 outside of the non-pressure head 27 and comprises a casing having a chamber 32 containing a latch 33 mounted to rock on a pin 34 secured in said casing.

The casing of the latch device 31 and the latch 33 are provided with substantially aligned apertures through which a brake cylinder push rod 35 slidably extends. The push rod 35 is pivotally connected to the brake lever 24 by means of a pin 49 and is provided on one side with a plurality of teeth 36 with which the wedge-shaped side wall 37 of the aperture through the latch 33 is adapted to coact upon counterclockwise rotation of said latch for effecting locking engagement between said push rod and latch.

A pull rod 40 having one end operatively connected to the latch 33 extends into a chamber 38 in the clutch casing, wherein a spring 39 acts on said rod to turn said latch in a counterclockwise direction and thereby into locking engagement with push rod 36.

According to one feature of the invention, the non-pressure head 27 is provided with a bore containing a latch release piston 43 which is provided with a stem 44 slidably extending through an aperture in a cap 45 closing the open end of said bore. The piston stem 44 is arranged in operating alignment with the usual latch release pin 46 which is mounted to slide in a suitable bore in the clutch casing 31, the right hand end of said pin 46 being adapted to engage and move the latch 33 to the release position, as shown in the drawings, against the opposing pressure of spring 39. The latch release piston 43 has at its left hand face a pressure chamber 47, and at the opposite face a chamber 48 open to the atmosphere, and the length of the bore containing said piston is such as to permit a definite degree of movement of said piston for reasons which will be hereinafter explained.

The auxiliary load brake cylinder 5 comprises a casing containing a piston 83 adapted to operate a push rod 84 which is connected to one end of a brake lever 85 which is mounted to pivot on a pin 88. The other end of the lever 85 is connected by a tension link 86 to a lug 87 provided on the latch box casing 31.

The load cylinder pressure head 26 is provided with a chamber 52 containing a release valve 53 and a spring 54 for urging said release valve to its seat. The release valve 53 has a fluted stem 55 extending into the brake cylinder and adapted to be engaged by the brake cylinder piston 28 for unseating said valve.

A pipe bracket 56 is carried by the brake cylinder pressure head 26, while carried by said bracket is the transfer valve device 6.

The transfer valve device 6 comprises a piston 57, and a stem 58 controlled by said piston and adapted to operate a slide valve 59 contained in a valve chamber 60. The piston 57 has on one face a gasket 61 adapted at one time to effect a leak-proof seal with a seat rib 62, said piston having at the opposite face a chamber 63 containing a valve member 64 carried by and movable with the piston 57, said valve member being provided with a gasket 65 adapted at one time to effect a leak-proof seal with a seat rib 66.

Disposed in the upper end of the transfer valve chamber 60 is a seat member 67 through which the stem 58 slidably extends, and mounted on said stem in engagement with a collar 68 is a spring support 69 between which and the seat member 67 is interposed a spring 70 for urging the stem 58 in a downward direction, such downward movement being limited by the engagement of a pin 71, carried by the stem 58, with the seat member 67.

The transfer valve device 6 further comprises the usual vent valve piston 72 having at one side a chamber 73 in constant communication with the atmosphere through a passage 74 and containing a spring 75 adapted to urge said valve piston into sealing engagement with a seat rib 76.

The load change-over valve device 7 comprises a casing having a chamber 77 in constant communication with the auxiliary reservoir 2 through a pipe 78, a passage 79 in the pipe bracket 56 and a pipe 80, said chamber containing a rotary valve 81 adapted to be turned to various load positions by means of a shaft 82.

The rotary valve 81 of the change-over valve device 7 has three different operating positions corresponding to various degrees of load adapted to be carried by the car, these positions being "empty" position, "⅛ to ½ load" position, and "½ to full load" position, which positions may be indicated by three index marks 89 provided on an escutcheon plate 90 secured to the outer surface 91 of the car.

The shaft 82 for turning the rotary valve 81 to its various positions has its outer end journaled in a suitable bore in a bracket 92 which is secured to the inner surface of the side 91 of the car, as clearly shown in Figs. 8 and 9 of the drawings.

Secured to a lug 95 projecting from one side of the bracket 92 is a quadrant 96 having three V like notches 97 corresponding to the three positions of the change-over valve rotary valve 81.

At one side of the quadrant 96 a lever 98 is mounted on a squared portion 99 of the shaft 82 so as to have driving engagement therewith. The lever 98 is provided with a through slot 41 for a portion of its length in which slot a latch 100 is mounted to slide, said latch having an offset portion 101 adapted to engage the quadrant 96 in the notches 97. A spring 102 is disposed within the lever 98 and acts on the latch 100 urging said latch into engagement with quadrant 96.

A lever 103 is journaled on a round portion of the shaft 82 between the quadrant 96 and the end of the bracket 92, said lever being free to rotate on said shaft. The lever 103 is provided with a bent arm 105 the end of which is disposed in the plane of rotation of lever 98 and is thereby adapted to engage said lever for rotating said lever in a clockwise direction, as viewed in Fig. 5 of the drawings. The lever 103 is also provided with a bent arm 106 the end portion of which is disposed in the plane of rotation of lever 98 and extends through aligned slots 107 in the opposite sides of said lever and through an elongated opening 108 in the latch 100, the arm 106 thereby acting to hold the latch 100 in the lever 98 and in operating alignment with quadrant 96.

The lever arm 106 is provided adjacent its outer end with a cam surface 110 adapted to cooperate with end wall 109 of the opening 108 in the latch 100 to withdraw said latch from notches 97 in the quadrant 96 upon counterclockwise rotation of lever 103 relative to lever 98. A spring 111 having one end connected to lever 98 and the other to lever 103 is provided to urge the lever arm 105 into engagement with the lever 98.

A piston 112 is provided for turning the change-over valve operating shaft 82 in a counterclockwise direction, as viewed in Figs. 5 and 7 of the drawings, to thereby change the adjustment of the change-over valve device 7 when the car lading is increased. This piston has at one side a pressure chamber 113 and at the opposite side a chamber 114 containing a spring 115 for urging said piston towards the left hand, such movement being limited by a plurality of stop lugs 116. One end of a rod 117 is connected to the piston 112 while the other end of said rod is pivotally connected to one end of a rocker arm 118 carried by a portion 119 of the car body. A member 120 adapted to be carried by the car truck is positioned to be engaged by the free end of the rocker arm 118.

The rod 117 is provided intermediate its ends with a slot 121 of a certain specific length, which will hereinafter be defined, and is connected to the lever 103 by a pin 122 which extends through said slot and a slot 123 in said lever.

A piston 124 is disposed in parallel operating alignment with piston 112 and has at one side a pressure chamber 125 connected to pipe 78 and at the opposite side a chamber 126 containing a spring 127 adapted to urge said piston towards the left hand and into sealing engagement with a seat rib 128. A seat rib 129 is provided on the right hand face of piston 124 adapted to engage and seal against a gasket 130. The piston 124 is provided with a piston stem 131 having an elongated slot 132. A pin 133 extends through the slot 132 and a slot 134 in the end of the lever 103 thereby connecting said rod and lever together.

A cut-off valve device is provided for controlling communication from piston chamber 125 to piston chamber 113 and comprises a valve piston 135 having at one side a chamber 136 in constant communication with the atmosphere through a passage 137 and having at the opposite side a chamber 138 connected to a pipe 139, the chamber 138 containing a slide valve 140 adapted to be operated by a stem 141 carried by the valve piston 135. A spring 142 is disposed in chamber 136 and acts on the valve piston 135 to urge said valve piston into engagement with a seat rib 143.

A shaft 170 is journaled in the base of bracket 92 and extends into a chamber 171 within said bracket and also through the side 91 of the car and through the escutcheon plate 90. A bent lever 172 has one end secured to the end of the shaft 170 within chamber 171 and extends through a slot 173 in the bracket 92, the free end of said lever extending into an elongated opening 174 in the lever 103 so as to obtain driving engagement therewith. A handle 93 is secured to the end of shaft 170, outside of the escutcheon plate 90, whereby the lever 103 may be manually operated to change the position of the change-over valve rotary valve 81.

A shaft 175 freely extends through an axial bore in shaft 170 into chamber 171 and therein is secured to the outer end of shaft 82. The outer end of shaft 175 extends slightly beyond the outer end of the shaft 170 and secured to the outer end of shaft 175 is a pointer 94 adapted to cooperate with the index marks 89 on the escutcheon plate 90 for indicating the position of the rotary valve 81.

In operation, in order to charge the brake system with fluid under pressure, fluid under pressure is supplied to brake pipe 12 in the usual well known manner and from thence flows through chamber 14 and passage 13 in the triple valve device 1 to the piston chamber 11. With the parts of the triple valve device in release position, as shown in the drawings, fluid under pressure flows from chamber 11 through the feed groove 144 to valve chamber 15 from thence to the auxiliary reservoir 2.

With the parts of the triple valve device 1 in release position, the usual brake cylinder passage 145 is vented to the atmosphere through cavity 146 in slide valve 16, passage 147, pipe 148, and a retaining valve device 149 assuming the retaining valve device to be in the usual cutout position in which it is not adapted to limit the release of brakes.

The brake cylinder passage 145 is connected to a pipe 150 which leads to the pipe bracket 56 wherein a passage 151 connects to said pipe and leads to a pipe 152 which in turn leads to the seat of the change-over rotary valve 81. With the rotary valve 81 in "empty" position, as shown in Fig. 2 of the drawings, a cavity 153 establishes communication between pipe 152 and pipes 154 and 155 leading to the empty brake cylinder 3 and compensating reservoir 8, respectively, so that said brake cylinder and reservoir are vented to the atmosphere by way of the brake cylinder passage 145, when the triple valve device 1 is in the release position.

With the change-over rotary valve 81 in the "empty" position, the auxiliary load brake cylinder 5 is vented to the atmosphere through pipe 75

156, a cavity 157 in said rotary valve and an atmospheric exhaust pipe 158.

Fluid at the pressure obtained in the auxiliary reservoir 2 is supplied through pipe 80 to passage 79 in the pipe bracket 56 and flows through said passage to chamber 160 at the lower face of the transfer valve piston 57. With the transfer valve chamber 60 initially vented, the pressure of fluid thus applied to piston 57 moves said piston and thereby the slide valve 59 against the opposing pressure of spring 70 to the upper position, as shown in the drawings. In this position of the slide valve 59, the primary load cylinder 4 is open to the atmosphere through a passage 161, a cavity 162 in said slide valve, passage 163, past the upper end of the vent valve piston 72, which is normally held in the position shown in the drawings by spring 75, and from thence through chamber 73 and the atmospheric exhaust passage 74.

Fluid at auxiliary reservoir pressure supplied to passage 79 in the pipe bracket 56 flows to pipe 78 and from thence into the rotary valve chamber 77 of the change-over valve device 7 wherein such pressure acts to hold the rotary valve 81 seated. Fluid at auxiliary reservoir pressure also flows through pipe 78 to the piston chamber 125 in the change-over valve adjusting means 9.

At the beginning of charging the brake system, the spring 127 acting on piston 124 holds said piston in sealing engagement with seat rib 128 so that fluid supplied from the auxiliary reservoir through pipe 78 initially acts on said piston over the area within said seat rib. The spring 127 is adapted to exert such a pressure on piston 124 as to hold said piston in sealing engagement with seat rib 128 until the auxiliary reservoir pressure is increased to some chosen degree such for example as 20 pounds, whereupon the spring 127 is overcome and the piston 124 starts moving toward the right hand. As soon as the piston 124 moves sufficiently to break the seal with seat rib 128, the full area of said piston becomes exposed to the pressure of fluid supplied through pipe 78 which causes said piston to promptly move with snap action to its extreme right hand position in which the seat rib 129 seals against gasket 130 and thereby prevents leakage of fluid under pressure past said piston from chamber 125 and thereby the auxiliary reservoir 2. This movement of piston 124 and thereby the piston rod 131 is relative to lever 103 due to the slot 132 in said rod.

In the right hand position of piston 124 a passage 164 is opened to chamber 125 which permits fluid under pressure to flow from said chamber to pipe 139 and from thence to valve chamber 138 of the cut-off valve device.

In the cut-off valve device, the pressure of spring 142 is such as to hold the valve piston 135 seated on seat rib 143 against the pressure of fluid initially obtained in chamber 138 by the operation of piston 124, and in this position of said valve piston and consequently of slide valve 140, a passage 165 is open to chamber 138 past the upper end of said slide valve. Consequently, fluid under pressure supplied to chamber 138 flows to passage 165 and from thence through a pipe 166 to piston chamber 113 wherein said pressure acts to move the piston 112 toward the right hand against the opposing pressure of spring 115.

This movement of the adjusting piston 112 and consequently of rod 117 turns the rocker arm 118 into engagement with the member 120 which limits the degree of movement of said rod. It will be evident that if the car is empty the portion 119 of the car body will be further away from member 120 than if the car is loaded and that the distance between the portion 119 of the car body and member 120 will reduce according to the load placed on the car, so that the degree of movement of the rocker arm 118 and rod 117 will be increased from a minimum, when the car is empty, to a maximum when the car is fully loaded.

As the rod 117 is moved by the pressure of fluid acting on piston 112, said rod engages pin 122 at the left hand end of the slot 121 and then acts to turn the lever 103 in a counterclockwise direction on the shaft 82. This movement of lever 103 is initially relative to lever 98 due to the locking action of the latch extension 101 in one of the quadrant notches 97, but the continued movement of said lever causes the cam surface 110 on the lever arm 106 to urge the latch 100 outwardly in the lever 98 and if such continued movement is sufficient, the latch extension 101 is disengaged from the quadrant notch 97 whereupon spring 111 acts to promptly turn the lever 98 and thereby the shaft 82 in a counterclockwise direction.

In the drawings the portion 119 of the car body is shown in the position assumed when the car is empty, so that the operation of the rod 117 and lever 103 will not be sufficient to disengage latch 100 from the quadrant notch 97 and thus permit movement of the lever 98 from the "empty" position in which it is shown. However, if the car is loaded to between ⅙ and ½ of its capacity, then the portion 119 of the car body will be so located with respect to the member 120 that the rod 117 will turn the lever 103 sufficiently to release the latch extension 101 from the quadrant notch 97 and permit the spring 111 to turn the lever 98 until the latch engages in the next or middle quadrant notch 97.

If the load on the car is ½ or more of the car capacity, then the lever 103 will be turned sufficiently to release the latch 100 from the middle notch 97 and permit spring 111 to turn the lever 98 until the latch engages in the last or third notch 97. If the car is initially empty and is then loaded to less than ⅙ capacity, or if the car is initially ⅙ loaded and the load is increased to a degree less than ½ capacity, it will be noted that the operation of rod 117 and lever 103 will not be sufficient to release the latch 100 from the quadrant notch 97, so that the position of the change-over valve 7 will not be changed.

In the manner just described, the lever 98 is operated to position the change-over rotary valve 81 when the pressure in the auxiliary reservoir 2 is increased to a chosen low degree, such as 20 pounds, in initially charging the train. Now when the auxiliary reservoir pressure is increased to a certain higher pressure, such for example as 30 pounds, this pressure being obtained in the cut-off valve chamber 138, by way of piston chamber 125 and pipe 139, overcomes the opposing pressure of spring 142 on valve piston 135 and moves said valve piston out of engagement with seat rib 143. The full area of valve piston 135 is thereby exposed to the pressure of fluid in chamber 138 which causes prompt movement of said valve piston to its upper position in which it seals against a gasket 167 to prevent leakage of fluid under pressure from chamber 138 and thereby the auxiliary reservoir 12.

This movement of valve piston 135 to its upper position shifts the slide valve 140 to the position shown in the drawings, in which a cavity 168 in said slide valve connects passage 165 to an atmospheric exhaust passage 169 and through this communication fluid under pressure is vented from the piston chamber 113.

With the pressure of fluid thus relieved in chamber 113, spring 115 returns the piston 112, rod 117 and rocker arm 118 to their normal position as shown in the drawings. As the pressure of rod 17 against pin 122 is thus relieved, the lever 103 is turned in a clockwise direction by spring 111 until the arm 105 engages the lever 98, in case there is clearance between said arm and lever, and then the continued movement of said rod is relative to lever 103, the length of slot 121 being such as to permit return of the piston 112 to the normal position regardless of the adjusted position of levers 98 and 103.

The change-over valve device 7 remains in the position to which it is adjusted in the manner above described unless changed manually, in a manner to be hereinafter described, or unless the pressure in the auxiliary reservoir 2 becomes reduced to a low degree such for example as 10 pounds, as may occur, in case the car is set out for unloading, due to leakage or the release of fluid from the auxiliary reservoir 2 by means of the usual manually operated auxiliary reservoir release valve (not shown).

When the pressure in the auxiliary reservoir 2 becomes reduced to some low pressure, such as 10 pounds, the pressure of spring 127 overcomes the reduced auxiliary reservoir pressure acting on the opposite side of the piston 124 and moves said piston toward the left hand into engagement with the seat rib 128, and during such movement, the piston rod engages the pin 133 in case the change-over valve device is in any position except "empty" position, and then acts through said pin to turn the lever 103 in a clockwise direction and thereby return said lever to "empty" position. In case the lever 103 is already in "empty" position, as might be the case if the car had been hauled empty, then the movement of the piston rod towards the left hand is merely relative to the lever 103. However, if the lever 103 is turned by the piston rod 131, the lever arm 105 acting against the lever 98 returns said lever and thereby the load change-over valve device 7 to "empty" position, the latch extension 101 slipping from one notch 97 to another in the quadrant 96 until the "empty" position is reached.

It will be noted that the length of the slot 132 in the piston rod 131 is such as to permit operation of lever 103 by piston 112 to properly position the change-over rotary valve 81 when the piston 124 is in its right hand position and is also such as to ensure turning the change-over rotary valve 81 to the "empty" position when the piston 124 is moved to its left hand position upon substantial depletion of the fluid pressure in the auxiliary reservoir 2.

Since the handle 93 at the side of the car is operatively connected through the bent lever 172 to lever 103, it will be noted that by turning said handle, the lever 103 may be operated to change the adjustment of the change-over rotary valve 81 the same as when the lever 103 is operated by the pistons 112 and 124, but in order to permit such manual adjustment by handle 93, the piston 124 must be in its right hand position to permit movement of lever 103.

Such manual adjustment of the change-over valve device 7 is desirable in case a car equipped with the improved empty and load brake system is to be operated in different types of service, that is, for instance, in express service as well as in freight service, because in express service cars are generally braked with a force equal to a greater percentage of the car weight than is the case in freight service, and by means of the handle 93, the adjustment of the change-over valve device 7 can be changed to provide a greater braking force, in case the car is empty or only partially loaded, than is desirable in freight service but which will more nearly correspond to that on other cars in the express train. For instance, while the improved empty and load brake system is intended primarily for use in freight service to provide a braking force within a range of from 50% to 30% regardless of lading, the braking force for the car may be increased to 75% if the change-over valve device 7 is turned by handle 93 to the "⅛ to ½ load" position when the car is empty, or to the "½ to full load" position in case the car is loaded about 25%.

In case the empty and load brake system is applied to a car primarily adapted for use in express service and it is desired to operate the car in freight service, it will be noted that if the car lading exceeds ⅛ the load, the braking force on the car may be decreased by operating handle 93 to adjust the change-over valve device 7 to a lower setting.

With the brake system charged with fluid under pressure, and with the change-over valve device 7 in the "empty" position, as shown in Fig. 2 of the drawings, if it is desired to effect an application of the brakes, the pressure of fluid in the brake pipe 12 is reduced in the usual manner, and the consequent reduction in pressure in chamber 11 of the triple valve device 1 permits auxiliary reservoir pressure in chamber 15 to move the slide valves 16 and 17 to service position in which the usual service port 176 in the main slide valve 16 is uncovered by the auxiliary slide valve 17 and registers with the usual brake cylinder passage 145. In this position of slide valves 16 and 17, fluid under pressure flows from valve chamber 15 and thereby auxiliary reservoir 2 to passage 145 and from thence through pipe 150, passage 151 in the pipe bracket 56, pipe 152, and cavity 153 in the change-over rotary valve 81 to pipe 154 leading to the slack take-up and empty cylinder 3 and at the same time to pipe 155 leading to the compensating reservoir 8. Fluid under pressure is thus simultaneously supplied to the empty brake cylinder 3 and to the compensating reservoir 8 and acts on the brake cylinder piston 19 to move said piston and thereby the push rod 23 outwardly. This outward movement of the push rod 23 turns the brake lever 24 about the fulcrum 50 in a counterclockwise direction which acts to first take up the slack in the brake rigging and then apply the brakes in the usual manner.

When the change-over rotary valve 81 is in "empty" position and the brakes are applied in the manner just described, only the slack take-up and empty cylinder 3 is operative since the auxiliary load cylinder 5 is vented to the atmosphere by way of pipe 156, cavity 157 in the rotary valve 81 and the atmospheric exhaust passage 159, while the primary load cylinder 4 is open to the atmosphere through passage 161, cavity 162 in the transfer valve device 6, passage 163, chamber 73 at the spring side of the vent valve piston 72 and passage 74, it being noted that the transfer valve device is maintained in the position shown in the drawings by auxiliary reservoir pressure in chamber 160 acting on the piston 57. With the primary load cylinder 4 in release position the notched push rod 35 is free to slide through the clutch 33, so that when the brakes are applied by the empty cylinder 3 said push rod moves with the brake lever 24.

In order to release the brakes after an application as effected by operation of the empty brake cylinder 3, the pressure in brake pipe 12 and thereby in the triple valve piston chamber 11 is increased, which moves the triple valve parts to release position. In this position, fluid under pressure is supplied from the piston chamber 11 through the feed groove 144 to valve chamber 15 and thereby the auxiliary reservoir 2 for recharging said reservoir, and fluid under pressure is vented from the empty cylinder 3 and compensating reservoir 8 by way of pipes 154 and 155, respectively, cavity 153 in the rotary valve 81, pipe 152, passage 151 in the pipe bracket 56, pipe 150, brake cylinder passage 145 in the triple valve device 1, cavity 146 in the main slide valve 16, passage 147, pipe 148 and from thence through the retaining valve device 149.

If the change-over rotary valve 81 is in the middle or "⅙ to ½ load" position, as shown in Fig. 3 of the drawings, pipe 155 leading to the compensating reservoir 8 is lapped, pipe 152, which is connected to the triple valve device 1, is connected through a cavity 185 in said rotary valve to a pipe 189 leading to the transfer valve chamber 60, the empty cylinder pipe 154 and a pipe 186, which leads to the clutch release pin piston chamber 47, are both connected to a cavity 187 in said rotary valve which cavity is also connected to a pipe 188, which leads to the transfer valve chamber 60, and the auxiliary load cylinder 5 is vented to the atmosphere through pipe 156, cavity 157 in rotary valve 81 and the atmospheric exhaust passage 158, in the same manner as when said rotary valve is in "empty" position.

With rotary valve 81 of the change-over valve device 7 in the "⅙ to ½ load" position establishing the communications just described, if an application of the brakes is effected by reducing the pressure of fluid in the brake pipe 12, fluid under pressure supplied from the auxiliary reservoir 2 through the triple valve device 1 to passage 145 flows through pipe 150, passage 151 in the pipe bracket 56, pipe 152, cavity 185 in the change-over rotary valve 81 and pipe 189 to the transfer valve chamber 60 and from thence through passage 188 and cavity 187 in the rotary valve 81 to pipe 154 leading to the combined slack take-up and empty brake cylinder 3 and also from said cavity to pipe 186 leading to piston chamber 47 of the clutch device 31.

The pressure of fluid thus applied to the empty cylinder piston 19 actuates said piston and thereby the brake lever 24 to first take up the slack in the brake rigging and then apply braking force to the car wheels, and this movement of the brake lever 24 draws the notched push rod 35 out of the load cylinder hollow piston rod 29.

In the transfer valve device 6, chamber 63 at the lower side of the valve member 64 is normally supplied with fluid from the auxiliary reservoir 2 by way of chamber 160, past the piston 57, when disengaged from seat rib 62, and through a passage 190 containing a choke plug 191, while the valve member 64 is subject on the opposite face, within the seat rib 66, to the pressure obtained in valve chamber 60 and acting in the combined slack take-up and empty brake cylinder 3.

When a chosen pressure is obtained in the transfer valve chamber 60, such pressure acting on the valve member 64 within the seat rib 66 in addition to the pressure of spring 70 acting through stem 58 on said valve member overcomes the opposing reduced auxiliary reservoir pressure in chamber 63 and moves the valve member 64 away from the seat rib 66. The pressures of fluid in chambers 63 and 60 then substantially equalize, and the piston 57 thereby becomes subject on one face to the pressure in chamber 60 while subject on the opposite face to auxiliary reservoir pressure in chamber 160, and since the area of said piston is less than the area of valve member 64, as defined by seat rib 66, the spring 70 acts to promptly and positively move the piston 57 into engagement with seat rib 62.

With the piston 57 engaging seat rib 62, the area subject to auxiliary reservoir pressure is reduced to that within said seat rib while the area outside of said seat rib is subject to the pressure in chamber 60, due to equalization through passage 190, thereby further reducing the pressure opposing the action of spring 70 so as to ensure said spring holding the piston 57 in the lower position.

The movement of the transfer valve piston 57 to its lower position shifts the slide valve 59 to a position in which cavity 162 connects passage 189 to passage 161, so that fluid under pressure supplied by the triple valve device 1 to passage 189 by way of the rotary valve 81 then flows to passage 161 and through said passage to the primary load cylinder 4 and also from said passage through a passage 192 to the lower face of the vent valve piston 72.

It will be noted that while the parts of the transfer valve device are in their normal or upper position, the lower face of the vent valve piston 72 is open to the atmosphere through passage 192 and from thence through passage 161 leading to the primary load cylinder 4, cavity 162 in the slide valve 59, passage 163, vent valve chamber 73 and passage 74, which ensures that spring 75 will maintain the vent valve 72 in its lower position so as to maintain the primary load cylinder 4 vented while fluid is being supplied to the slack take-up cylinder 3, but just as soon as the parts of the transfer valve device are moved to their lower position as above described, fluid under pressure is supplied to the face of the vent valve piston 72 within the seat rib 76 and acts to shift said vent valve piston to its upper position and thereby close communication from passage 163 to the atmospheric passage 74.

Fluid under pressure supplied through passage 161 to the primary load cylinder 4 acts on the piston 28 and moves said piston and the clutch device 31 towards the right hand, such movement being relative to the notched push rod 35 as long as the latch 33 is maintained in the release position, as shown in the drawings.

According to one feature of the invention, the clutch latch 33 is maintained in the release position until after the load cylinder piston 28 has moved a certain definite distance for reasons which will hereinafter be explained.

The latch release piston chamber 47 is in communication with the slack take-up cylinder 3 through pipe 186, cavity 187 in the rotary valve 81 and pipe 154 as hereinbefore described, so that the pressure of fluid acting in the slack take-up cylinder 3 also acts on the release pin piston 43 which is adapted to move outwardly as the load piston 28 and clutch 31 move outwardly. The pressure of fluid thus applied to the release pin piston 43 is adapted to maintain the latch 31 in release position until said piston engages the cap nut 45. Further movement of the load piston 28 and clutch 31 is then relative to the release pin piston 43 which permits the spring 39 to rotate the latch 33 into locking engagement with the notched push rod 35. With the clutch 31 thus locked to the push rod 35, the fluid pressure applied to the load piston 28 acts through the clutch 31 and push rod 35 on pin 49 and is thus applied to the brake lever 24 in addition to that applied to said lever by the pressure of fluid acting on the combined slack take-up and empty cylinder piston 19.

It should be noted in connection with the operation of the load cylinder piston 28, as above described, that there is an initial free movement of said piston for a distance governed by the extent of movement of the release pin piston 43, and then the latch 33 locks against the push rod 35, and since the brake shoes are, at this time, in engagement with the car wheels due to the action of the slack take-up cylinder 3, the load piston 28 then becomes immediately effective to increase the degree of brake application over that obtained by operation of the combined empty and slack take-up piston 19.

The movement of the latch release piston 43 is calculated to permit such free movement of the load piston 28 that the displacement volume of said load piston will be substantially equal to the volume of the compensating reservoir 8, thereby maintaining substantially the same relation between brake cylinder volume and auxiliary reservoir volume in the "⅛ to ½ load" position as is obtained in the "empty" position of the change-over valve device 7 when the compensating reservoir 8 is effective, with the result that brake cylinder pressure will bear substantially the same relation to brake pipe reduction in effecting an application of the brakes in both the "empty" and the "⅛ to ½ load" positions.

After the transfer slide valve 59 moves to its lower position and thus cuts off the supply of fluid under pressure to the combined slack take-up and empty brake cylinder 3, if the pressure in said cylinder and in the transfer valve chamber 60 should become reduced, due for instance to leakage, to a pressure lower than that acting in the load cylinder 4, then the pressure in the cylinder 3 and valve chamber 60 will be maintained by flow from the load cylinder 4 through passages 161 and 193 past a check valve 293 and from thence through passage 196 to valve chamber 60 which is in communication with the cylinder 3, so as to maintain both cylinders 3 and 4 effective and also to maintain the transfer valve device in the lower position. The check valve 293 is provided to prevent back flow of fluid under pressure from the cylinder 3 to the cylinder 4 through the communication just described, when the transfer valve device operates to cut the load cylinder 4 into action, thereby ensuring that the slack will be maintained taken up by the cylinder 3 until the clutch device 31 becomes locked to the push rod 35.

In order to effect a release of the brakes after an application with the change-over valve device 7 in the "⅛ to ½ load" position, the pressure of fluid in the brake pipe 12 is increased and the triple valve device 1 is thereby shifted to release position in which the auxiliary reservoir 2 is recharged with fluid under pressure and the brake cylinder passage 145 is opened to the atmosphere in the same manner as hereinbefore described.

With the brake cylinder passage 145 thus open to the atmosphere, fluid under pressure is first released from the primary load cylinder 4 by way of passage 161, and from thence either through cavity 162 in the transfer slide valve 59 to passage 189 or through passage 193 and past a release check valve 197 to passage 189 and from passage 189 through cavity 185 in the change-over rotary valve 81, pipe 152, passage 151 in the pipe bracket 56, pipe 150 and from thence through the brake cylinder passage 145.

When the pressure of fluid acting on the load cylinder piston 28 is thus reduced sufficiently, the pressure of the return spring 30 moves said piston towards the left hand or release position thereby relieving the braking pressure on the brake lever 24. This movement continues until the latch release pin 46 engages the end of the latch release piston stem 44. The latch release piston 43 is still maintained in engagement with the cap nut 45 by means of the empty cylinder pressure acting in chamber 47 so that said piston acts to prevent further movement of the release pin 46 towards the left hand. As a consequence, and due to the continued movement of the load piston 28 and thereby the clutch 31, the pin 46 acts to turn the latch 33 in a clockwise direction and out of locking engagement with the push rod 35.

After the latch 33 is thus disengaged from the push rod 35 the continued return movement of the load piston 28 and clutch device 31 is relative to the push rod 35 and acts to move the release pin piston 43 towards the left hand, the final movement of said load piston acting to unseat the release valve 53.

With the release valve 53 unseated, fluid under pressure is vented from the combined empty and slack take-up cylinder 3 and the latch release piston chamber 47 by way of pipes 154 and 186, respectively, cavity 187 in the change-over rotary valve 81, pipe 188, transfer valve chamber 60, passage 196, chamber 52, past the release valve 53 to the load cylinder 4 and from thence through the communication through which the primary load cylinder 4 is vented in the manner hereinbefore described.

The pressure in the combined empty and slack take-up cylinder 3 and consequently the pressure in the transfer valve chamber 60 continues to reduce in the manner just described, until auxiliary reservoir pressure acting in chamber 160, on the lower face of the transfer valve piston 57, is increased sufficiently to overcome the opposing pressure of fluid in chamber 60 plus the pressure of spring 70, whereupon the piston 57 is moved away from the seat rib 62. The full area of piston 57 is thereby exposed to auxiliary reservoir pressure as supplied through chamber 160 and this increased force on piston 57 promptly shifts said piston to its upper position in which the valve gasket 65 seals against the seat rib 66. Fluid under pressure then equalizes from chamber 160 into chamber 63 through the choke 191 in passage 190 and the auxiliary reservoir pressure thus obtained in chamber 63 and acting on the valve 64 positively maintains the transfer valve device in this position.

When the transfer valve piston 57 is moved to its upper position, as just described, the slide valve 59 disconnects passage 196 from valve chamber 60 and opens passage 189 to chamber 60, so that any fluid under pressure remaining in chamber 60 and the combined empty and slack take-up cylinder 3, which is connected to chamber 60 by way of passage 188, is now vented through chamber 60 directly to passage 189 and from thence in the same manner as hereinbefore described, thereby relieving all braking pressure on the brake lever 24. As the braking pressure is relieved from the brake lever 24, said lever is returned to the release position shown in the drawings in the usual manner, and such return movement moves the notched push rod 35 back into the hollow push rod 29 to its normal position.

When the brakes are released in the manner above described, it will be noted that fluid under pressure is vented from the lower face of the vent valve piston 72 through passage 192 and passage 161 along with the release of fluid under pressure from the primary load cylinder 4 until the transfer slide valve 59 is moved to its upper position and until said pressure is reduced sufficiently to permit spring 75 to move the vent valve piston 72 out of its upper position towards the seat rib 76, after which further release of fluid from the lower face of the vent valve piston 72 and load cylinder 4 will occur through passage 161, cavity 162 in the transfer slide valve 59, passage 163, vent valve chamber 73 and atmospheric exhaust passage 74 in the usual manner.

If the load change-over valve device 7 is in the "½ to full load" position, the compensating reservoir passage 155 is blanked and the passages 152 and 189 are connected by cavity 185 in the rotary valve 81 as is the case when said rotary valve is in the "⅙ to ½ load" position. Further, the release pin piston chamber 47 is vented to the atmosphere, when the rotary valve 81 is in "½ to full load" position, by way of pipe 186, a cavity 198 in said rotary valve and the atmospheric exhaust passage 158 so that said piston will be ineffective to provide the initial free movement of the load piston 28 hereinbefore described. In addition to the above, the slack take-up and empty cylinder 3 is connected to the transfer valve chamber 60 by way of pipe 154, a cavity 199 in rotary valve 81, and pipe and passage 188, while the auxiliary load cylinder 5 is connected through pipe 156, a cavity 200 in rotary valve 81 and pipe and passage 201 to passage 161 in the pipe bracket 56.

In effecting an application of the brakes with the communications, just described, established through the change-over rotary valve 81 in the "½ to full load" position, the triple valve device 1, slack take-up and empty cylinder 3 and transfer valve device 6 operate in the same manner as when the brakes are applied in the "⅙ to ½ load" position, but it will be noted that fluid under pressure is not supplied to the release pin piston chamber 47 as occurs in said position, since said piston chamber is vented to the atmosphere through the rotary valve 81.

After the operation of the combined slack take-up and empty cylinder piston 3 to take up the slack in the brake rigging and draw the notched push rod 35 out of the hollow piston rod 29, the movement of the transfer slide valve to its lower position connects passage 189 to passage 161 so that fluid supplied to passage 189 by operation of the triple valve device now flows to passage 161 and from thence to the primary load cylinder 4 and also from passage 161 through pipe and passage 201, cavity 200 in rotary valve 81, and pipe 156 to the auxiliary load cylinder 5. Fluid under pressure is thus simultaneously supplied to both of the load cylinders 4 and 5, the piston 28 in the primary load cylinder 4 being thereby moved in a direction toward the right hand, while the piston 83 in the auxiliary load cylinder 5 is moved by the pressure of fluid applied thereon in a direction toward the left hand. Due to the arrangement of the lever 85 and link 86 connection between the load cylinder 5 and the clutch device 31, however, the operation of the load cylinder piston 83 acts to move said clutch device in the same direction as the load cylinder piston 28 moves.

As the clutch device 31 is thus moved away from the non-pressure head 27, the latch release piston 43 remaining in the normal position shown in the drawings, permits the release pin 46 to likewise remain stationary so that spring 39 acts to turn the latch 33 into locking engagement with the notched push rod 35, after which, the pressure of fluid applied to both of the load pistons 28 and 83 is applied to the clutch device 31 and transmitted through the latch 33 to the notched push rod 35 and from thence to the brake lever 24, thereby applying the brakes on the car with the maximum degree of force.

It will be noted that when both load cylinders 4 and 5 are cut into action, the travel of the load cylinder piston 28 is less, by an amount equal to the movement of the latch release pin piston 43, than when only the load cylinder 4 is cut into action. According to the invention, the displacement volume of the load cylinder piston 28 created by movement for a distance equal to the travel of the latch release piston 43 substantially equals the displacement volume of the load cylinder piston 83 when operated to apply the brakes, so that the combined displacement volumes of the two load pistons 28 and 83, when both are acting, bears substantially the same relation to the volume of the auxiliary reservoir 2 as does the displacement volume of the load cylinder piston 28 when the latch release piston 43 is effective to provide a predetermined initial free movement of the piston 28.

It is at this time desired to call attention to the fact that in the design of automatic fluid pressure brake systems a certain ratio is provided between the volume of the auxiliary reservoir and the displacement volume of the brake cylinder piston in order to provide a certain relation between the pressure obtained in the brake cylinder and the degree of reduction in brake pipe pressure in effecting an application of the brakes. Obviously, a different brake cylinder piston displacement volume can not be employed than that for which the auxiliary reservoir is intended without changing this ratio. According to the invention, three brake cylinders are employed with an auxiliary reservoir of a certain specific volume such as would be employed with a single cylinder in connection with a single capacity brake system, but means are provided for maintaining substantially the same ratio between the auxiliary reservoir volume and brake cylinder piston displacement volume under all conditions of brake cylinder operation, that is, whether only one cylinder, or two cylinders or the three cylinders is effective, as would be obtained with the one cylinder of a single capacity brake system. It will be noted that when only the combined empty and slack take-up cylinder 3 is effective, the volume of the compensating reservoir 8 is added to the displacement volume of the piston 19 in order to provide the proper relation to the volume of the auxiliary reservoir; when the cylinders 3 and 4 are effective, the load cylinder piston 28 is provided with a certain definite free movement, due to the action of the release pin piston 43, which is calculated to provide a displacement volume substantially equal to the volume of the compensating reservoir 8, so that with said reservoir cut out and the primary load cylinder 4 cut into action, the desired relation of brake cylinder piston displacement volume to the volume of the auxiliary reservoir is maintained, while when the auxiliary load cylinder 5 is cut into action, the latch release piston 43 is cut out of action, so as to reduce the displacement volume of the load piston 28, which reduced displacement volume plus that of the load cylinder piston 83 provides the proper relation to the volume of the auxiliary reservoir 2.

It will be evident from the above that, with the invention, the high range between the braking force developed on an empty car and that on a loaded car, heretofore ranging from 60% to 15% with a single capacity equipment employing one brake cylinder, may be reduced to a lower range, such as between 50% and 30%, by employing three brake cylinders and an auxiliary reservoir of the same volume as heretofore employed with a single capacity brake equipment.

A release of the brakes after an application effected by operation of the three brake cylinders 3, 4 and 5 is obtained in the same manner as when only the load cylinder 4 is effective, fluid under pressure being vented from the load cylinder 5 through pipe 156, cavity 200 in the rotary valve 81, pipe and passage 201 and from thence through passage 161 along with the release of fluid under pressure from the load cylinder 4.

It will now be apparent that according to the invention an improved empty and load brake equipment is provided embodying three brake cylinders, change-over valve means for cutting into action either one, two or the three brake cylinders according to the load condition of the car, means for maintaining the proper relation between the displacement volume of the brake cylinders and the auxiliary reservoir, means for automatically adjusting the change-over valve means according to the load condition of the car during the initial charging of the brake system while the car is at rest and at a time following a likely change in car load and means for manually adjusting the change-over valve means, if such is desired.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a fluid pressure brake, the combination with a brake lever, of a push rod for operating said lever, a brake cylinder piston movable relatively to said push rod, clutch means operative upon a predetermined movement of said piston relative to said push rod for locking said piston into operative engagement with the push rod, and means for preventing said locking action until the piston has moved a further amount relative to said push rod.

2. In a fluid pressure brake, the combination with a brake lever, of a push rod for operating said lever, a brake cylinder piston for applying braking force to said push rod, clutch means operative upon a predetermined movement of said piston relative to said push rod for locking said piston into operative engagement with said push rod, and means movable with said piston to prevent said locking action until said piston has moved a predetermined further amount.

3. In a fluid pressure brake, the combination with a brake lever, of a push rod for operating said lever, a brake cylinder piston for applying braking force to said push rod, clutch means operative upon a predetermined movement of said piston relative to said push rod for locking said piston into operative engagement with said push rod, and means movable by fluid under pressure with said piston to prevent said locking action until after said piston has moved a predetermined further amount.

4. In a fluid pressure brake, the combination with a brake lever, of a brake cylinder piston for applying braking force to said lever, means including a clutch operative at one time to operatively connect said piston with said lever upon a certain movement of said piston, and means operable at another time to render said clutch ineffective to connect said piston with said lever upon said certain movement.

5. In a fluid pressure brake, the combination with a brake lever, of a push rod operatively connected to said lever, a brake cylinder piston for operating said rod and having a release position, a take-up piston operatively connected to said lever for moving said lever and thereby said rod relatively to said brake cylinder piston, a clutch for operatively connecting said brake cylinder piston with said push rod, and means for controlling the operation of said clutch and operative at one time to render said clutch effective immediately upon movement of said brake cylinder piston from release position and operative at another time to maintain said clutch ineffective until after said piston has moved a predetermined distance from release position.

6. In a fluid pressure brake, the combination with a brake lever, of a push rod operatively connected to said lever, a brake cylinder piston for operating said rod, a take-up piston operatively connected to said lever for moving said lever and thereby said rod relatively to said brake cylinder piston, a clutch for operatively connecting said brake cylinder piston with said push rod upon a predetermined movement of said brake cylinder piston relative to said rod, and means controlled by fluid under pressure for delaying the operation of said clutch until said brake cylinder piston has moved a predetermined further amount.

7. In a fluid pressure brake, the combination with a brake lever, of a push rod operatively connected to said lever, a brake cylinder piston for operating said rod and having a release position, a take-up piston operatively connected to said lever for moving said lever and thereby said rod relatively to said brake cylinder piston, a clutch for operatively connecting said brake cylinder piston with said push rod, and means operative by fluid under pressure for rendering said clutch ineffective until said brake cylinder piston has moved a predetermined distance from release position, and means for controlling the supply of fluid under pressure to said fluid pressure operated means.

8. In a fluid pressure brake, the combination with a brake lever, of a push rod operatively connected to said lever, a brake cylinder piston for operating said rod and having a release position, a take-up piston operatively connected to said lever for moving said lever and thereby said rod relatively to said brake cylinder piston, a clutch for operatively connecting said brake cylinder piston with said push rod, means operative by fluid under pressure for rendering said clutch ineffective until said brake cylinder piston has moved a predetermined distance from release position, and means for establishing a communication for supplying fluid under pressure to said take-up piston and to said fluid pressure operated means.

9. In a fluid pressure brake, the combination with a brake lever, of a push rod operatively connected to said lever, a brake cylinder piston for operating said rod and having a release position, a take-up piston operatively connected to said lever for moving said lever and thereby said rod relatively to said brake cylinder piston, a latch associated with said piston and having an effective position for locking said brake cylinder piston to said push rod and an ineffective position for permitting relative movement between said push rod and said piston, and means controlled by the movement of said brake cylinder piston from release position for controlling movement of said latch from the ineffective to the effective position, said means being operative at one time by fluid under pressure to maintain said latch in the ineffective position until after said brake cylinder piston has moved from release position a predetermined distance.

10. In a fluid pressure brake, the combination with a brake lever, of a push rod operatively connected to said lever, a brake cylinder piston for operating said rod and having a release position, a take-up piston operatively connected to said lever for moving said lever and thereby said rod relatively to said brake cylinder piston, a latch associated with said piston and having an effective position for locking said brake cylinder piston to said push rod and an ineffective position for permitting relative movement between said push rod and said piston, a device operative when subject to fluid under pressure to delay movement of said latch to said effective position until after said brake cylinder piston has moved from release position a chosen distance and operative when not subject to fluid under pressure to permit movement of said latch to the effective position immediately upon movement of said piston from release position, and means for at one time supplying fluid under pressure to said device for effecting the operation thereof and operative at another time to release fluid under pressure from said device.

11. In a fluid pressure brake, the combination with a brake lever, a push rod movable with said brake lever and operative to transmit braking force to said brake lever, a piston rod, a piston carrying said piston rod and operative to apply braking force through said piston rod to said push rod, a cylinder containing said piston, a latch carried by said piston rod operative upon movement of said piston relative to said cylinder to lock said piston rod to said push rod, means for holding said latch disengaged from said push rod when said piston is in the release position in said cylinder, a movable abutment operated by fluid under pressure at one time to move said means with said piston for a chosen movement of said piston, and valve means having one position for supplying fluid under pressure for operating said movable abutment, and another position for venting fluid under pressure from said movable abutment.

12. In a fluid pressure brake, the combination with a brake lever, a take-up piston operatively connected to said lever and operative by fluid under pressure to apply braking force to said lever, a push rod connected to and movable with said brake lever, a brake cylinder piston adapted to be connected to said push rod for applying braking force to said push rod and thereby said brake lever, a clutch device operative to connect said brake cylinder piston to said push rod for rendering said brake cylinder piston effective to apply braking force to said brake lever, means for controlling the operation of said clutch device and operative by fluid under pressure to maintain said clutch device ineffective during a predetermined movement of said brake cylinder piston relative to said push rod and operative when not subject to fluid under pressure to render said clutch device effective upon initial movement of said brake cylinder piston, and a valve device having one position for supplying fluid under pressure to said means and another position for venting fluid under pressure from said means.

13. In a fluid pressure brake, the combination with a brake lever, a take-up piston operatively connected to said lever and operative by fluid under pressure to apply braking force to said lever, a push rod connected to and movable with said brake lever, a brake cylinder piston adapted to be connected to said push rod for applying braking force to said push rod and thereby said brake lever, a clutch device operative to connect said brake cylinder piston to said push rod for rendering said brake cylinder piston effective to apply braking force to said brake lever, means for controlling the operation of said clutch device and operative by fluid under pressure to maintain said clutch device ineffective during a predetermined movement of said brake cylinder piston relative to said push rod and operative when not subject to fluid under pressure to render said clutch device effective upon initial movement of said brake cylinder piston, a valve device having one position for supplying fluid under pressure to said means and another position for venting fluid under pressure from said means, and means operative according to the load condition of the car for positioning said valve device.

14. In a fluid pressure brake, the combination with a brake lever, a take-up piston operatively connected to said lever and operative by fluid under pressure to apply braking force to said lever, a push rod connected to and movable with said brake lever, a brake cylinder piston adapted to be connected to said push rod for applying braking force to said push rod and thereby said brake lever, a clutch device operative to connect said brake cylinder piston to said push rod for rendering said brake cylinder piston effective to apply braking force to said brake lever, means for controlling the operation of said clutch device and operative by fluid under pressure to maintain said clutch device ineffective during a predetermined movement of said brake cylinder piston relative to said push rod and operative when not subject to fluid under pressure to render said clutch device effective upon initial movement of said brake cylinder piston, a valve device for controlling the supply of fluid under pressure to said means and to said take-up piston and brake cylinder piston and having one position for supplying fluid under pressure only to said take-up piston, another position for supplying fluid under pressure to said means and to said take-up piston and brake cylinder piston, and a third position for supplying fluid under pressure to said take-up and brake cylinder pistons and for venting fluid under pressure from said means, and means for positioning said valve device according to the load on the car.

15. In a fluid pressure brake, the combination with a brake lever, a take-up piston operatively connected to said lever and operative by fluid under pressure to apply braking force to said lever, a push rod connected to and movable with said brake lever, a brake cylinder piston adapted to be connected to said push rod for applying braking force to said push rod and thereby said brake lever, a clutch device operative to connect said brake cylinder piston to said push rod for rendering said brake cylinder piston effective to apply braking force to said brake lever, means for controlling the operation of said clutch device and operative by fluid under pressure to maintain said clutch device ineffective during a predetermined movement of said brake cylinder piston relative to said push rod and operative when not subject to fluid under pressure to render said clutch device effective upon initial movement of said brake cylinder piston, a valve device for controlling the supply of fluid under pressure to said means and to said take-up piston and brake cylinder piston and having one position for supplying fluid under pressure only to said take-up piston, another position for supplying fluid under pressure to said means and to said take-up piston and brake cylinder piston, and a third position for supplying fluid under pressure to said take-up and brake cylinder pistons and for venting fluid under pressure from said means, and means operative automatically according to the load condition of the car for positioning said valve device.

16. In a fluid pressure brake, the combination with a brake lever, a take-up piston operatively connected to said lever and operative by fluid under pressure to apply braking force to said lever, a push rod connected to and movable with said brake lever, a brake cylinder piston adapted to be connected to said push rod for applying braking force to said push rod and thereby said brake lever, a clutch device operative to connect said brake cylinder piston to said push rod for rendering said brake cylinder piston effective to apply braking force to said brake lever, means for controlling the operation of said clutch device and operative by fluid under pressure to maintain said clutch device ineffective during a predetermined movement of said brake cylinder piston relative to said push rod and operative when not subject to fluid under pressure to render said clutch device effective upon initial movement of said brake cylinder piston, a valve device for controlling the supply of fluid under pressure to said means and to said take-up piston and brake cylinder piston and having one position for supplying fluid under pressure only to said take-up piston, another position for supplying fluid under pressure to said means and to said take-up piston and brake cylinder piston, and a third position for supplying fluid under pressure to said take-up and brake cylinder pistons and for venting fluid under pressure from said means, and means operative either manually or automatically according to the load condition of the car for positioning said valve device.

17. In a fluid pressure brake, the combination with a brake lever, of an empty cylinder piston, a primary load cylinder piston and an auxiliary load cylinder piston, all of said pistons being operative to apply braking force to said lever, said empty cylinder piston being operatively connected to said brake lever at all times, a clutch device operative upon movement of said primary load cylinder piston for rendering either one or both of said load pistons effective to apply braking force to said brake lever, valve means adapted to be conditioned to either supply fluid under pressure to said empty piston only or to said empty piston and primary load piston or to said empty piston and both of said load pistons, and means adapted to condition said valve means according to the load on the car.

18. In a fluid pressure brake, the combination with a brake lever, of an empty cylinder piston, a primary load cylinder piston and an auxiliary load cylinder piston, all of said pistons being operative to apply braking force to said lever, said empty cylinder piston being operatively connected to said brake lever at all times, a clutch device operative upon movement of said primary load cylinder piston for rendering either one or both of said load pistons effective to apply braking force to said brake lever, valve means adapted to be conditioned to either supply fluid under pressure to said empty piston only or to said empty piston and primary load piston or to said empty piston and both of said load pistons, and means operative automatically according to the load on the car for conditioning said valve means.

19. In a fluid pressure brake, the combination with a brake lever, of an empty cylinder piston, a primary load cylinder piston and an auxiliary load cylinder piston, all of said pistons being operative to apply braking force to said lever, said empty cylinder piston being operatively connected to said lever at all times, a clutch device operative according to movement of said primary load cylinder piston for rendering either said primary load cylinder piston effective or both of said load cylinder pistons effective, a device adapted to be conditioned for selectively cutting in for action either said empty cylinder piston only, or said empty cylinder piston and primary load cylinder piston, or said empty cylinder piston and both of said load cylinder pistons, and means operative according to the condition of said device for controlling the operation of said clutch device and operative when both load pistons are cut in for action to render said clutch device effective upon the initial movement of said primary load piston, and operative when only the empty cylinder and primary load cylinder pistons are cut in for action to delay the operation of said clutch device until after said primary load cylinder piston has moved a predetermined distance.

20. In a fluid pressure brake, the combination with a brake pipe, an auxiliary reservoir, an empty cylinder, a primary load cylinder, an auxiliary load cylinder, a brake cylinder piston in each of said cylinders, and a valve device operative upon a reduction in brake pipe pressure for supplying fluid under pressure from said auxiliary reservoir to said cylinders for effecting the operation of said pistons, a change-over valve device adapted to be conditioned for selectively cutting in for action either said empty cylinder only, or said empty and primary load cylinders, or said empty and both load cylinders, valve means for controlling the supply of fluid under pressure from said auxiliary reservoir to said cylinders and operative, when either one or both of said load cylinders is cut in for action, to supply fluid under pressure first to said empty cylinder and then to either said primary load cylinder or to said primary and auxiliary load cylinders according to the condition of said change-over valve device, and means for adjusting the piston displacement volume of the cylinder or cylinders cut in for action to the volume of the auxiliary reservoir comprising a clutch device operative upon the initial movement of said primary load cylinder piston to render both load cylinder pistons effective when both load cylinder pistons are cut in for action, means controlled by the change-over valve device and operative when the auxiliary load cylinder piston is cut out of action for delaying the operation of said clutch device until after the primary load cylinder piston has moved a predetermined distance thereby increasing the displacement volume of the primary load cylinder piston over that when the auxiliary load cylinder piston is cut in for action, and means controlled by the selector valve device for adding volume to the displacement volume of the empty cylinder piston when both load cylinder pistons are cut out of action.

21. In a fluid pressure brake system, the combination with a plurality of brake cylinders, of valve means having an empty position for cutting into action one of said cylinders and having another position for cutting in for action another of said brake cylinders, and having still another position for cutting in for action still another of said brake cylinders, and means operable automatically when the pressure of fluid in said system is increased to a predetermined degree for adjusting said valve means to one or another of said positions, according to the load on the car.

22. In a fluid pressure brake system, the combination with a plurality of brake cylinders, of valve means having an empty position for cutting in for action one of said cylinders and adjustable according to the load on the car for selectively cutting in for action more of said brake cylinders, and means operable automatically when the pressure of fluid in said system is increased to a predetermined degree for adjusting said valve means according to the load on the car and operable when the pressure of fluid in said system is reduced to a lower degree to position said valve means in said empty position.

23. In a fluid pressure brake system, the combination with a plurality of brake cylinders, of valve means having an empty position for cutting in for action one of said cylinders and adjustable according to the load on the car for selectively cutting in for action more of said brake cylinders, means operable automatically when the pressure of fluid in said system is increased to a predetermined degree for adjusting said valve means according to the load on the car, and manually operated means for adjusting said valve means.

24. In a fluid pressure brake system, the combination with more than two brake cylinders, of valve means adjustable to at least three positions corresponding to various degrees of load on the car and operative in one of said positions to cut one of said brake cylinders in for action, and in another of said positions to cut another of said brake cylinders in for action and in a third position to cut still another of said brake cylinders in for action, and means operative automatically for adjusting said valve means to one or another of said positions, according to the load on the car.

25. In a fluid pressure brake system, the combination with more than two brake cylinders, of valve means adjustable to at least three positions corresponding to various degrees of load on the car and operative in one of said positions to cut one of said brake cylinders in for action, and in another of said positions to cut another of said brake cylinders in for action and in a third position to cut still another of said brake cylinders in for action, and means operative automatically upon charging said system with fluid under pressure for adjusting said valve means to one or another of said positions, according to the load on the car.

26. In a fluid pressure brake system, the combination with more than two brake cylinders, of valve means adjustable to at least three positions corresponding to various degrees of load on the car and operative in one of said positions to cut one of said brake cylinders in for action, and in another of said positions to cut another of said brake cylinders in for action and in a third position to cut still another of said brake cylinders in for action, and means operative automatically upon charging said system with fluid under pressure for adjusting said valve means to one or another of said positions, according to the load on the car and upon substantially complete venting of fluid under pressure from said system for adjusting said valve means to the position in which only one of said brake cylinders is cut in for action.

27. In a fluid pressure brake system, the combination with more than two brake cylinders, of valve means adjustable according to the load on the car for selectively cutting in for action one or more of said brake cylinders according to the load on the car, means operative automatically for adjusting said valve means according to the load on the car, and manually operated means operative after the operation of the automatic means for also adjusting said valve means.

28. In a fluid pressure brake system, the combination with a device adjustable according to the load on the car to provide a corresponding braking force on the car, means for adjusting said device, means operative as said system is charged with fluid under pressure for first effecting the operation of said adjusting means and then cutting said adjusting means out of action and operative when the pressure in said system is reduced to a chosen degree for adjusting said valve device for the empty car.

29. In a fluid pressure brake system, the combination with a load change-over valve device having a plurality of load positions for providing various degrees of braking force on the car according to the load on the car, an adjusting lever for moving said device to said plurality of positions, means for automatically effecting movement of said adjusting lever to increase the load setting of said device when the fluid pressure in said system is increased above a chosen degree and to move said device to an empty car setting when the pressure in said system is reduced to a lower degree.

30. In a fluid pressure brake system, the combination with a load change-over valve device having a plurality of load positions for providing various degrees of braking force on the car according to the load on the car, an adjusting lever for moving said device to said plurality of positions, a spring for moving said adjusting lever in the direction for increasing the load setting of said valve device, a control lever movable relatively to said adjusting lever and operative upon movement in one direction to render said spring effective and upon movement in the reverse direction to move said adjusting lever independently of said spring, means controlled by fluid under pressure and operative upon an increase in pressure in said system to first actuate said control lever to render said spring effective and to then cut said control lever out of action, and other means controlled by the pressure of fluid in said system and operative when the pressure in said system is reduced to a low degree to actuate said control lever to operate said adjusting lever independently of said spring.

31. In a fluid pressure brake system, the combination with a load change-over valve device having a plurality of load positions for providing various degrees of braking force on the car according to the load on the car, an adjusting lever for moving said device to said plurality of positions, a spring for moving said adjusting lever in the direction for increasing the load setting of said valve device, a control lever movable relatively to said adjusting lever and operative upon movement in one direction to render said spring effective and upon movement in the reverse direction to move said adjusting lever independently of said spring, means controlled by fluid under pressure and operative upon an increase in pressure in said system to first actuate said control lever to render said spring effective and to then cut said control lever out of action, other means controlled by the pressure of fluid in said system and operative when the pressure in said system is reduced to a low degree to actuate said control lever to operate said adjusting lever independently of said spring, and means for manually operating said adjusting lever to change the setting of said valve device after the operation of the means operative upon an increase in fluid pressure in said system.

32. In a fluid pressure brake, the combination with a brake lever, of a push rod adapted to operate said lever to effect an application of the brakes, a brake cylinder piston having a release position and movable therefrom by fluid under pressure for applying braking force through said push rod to said lever, means operative to render said piston effective, at one time, immediately upon movement out of release position, means operative to delay the effectiveness of said piston, at another time, until said piston has moved out of release position a chosen distance, and means for selectively controlling the operation of the two means which control the effectiveness of said piston.

33. In a fluid pressure brake, the combination with a brake lever, of a push rod adapted to operate said lever to effect an application of the brakes, a brake cylinder piston having a release position and movable therefrom by fluid under pressure for applying braking force through said push rod to said lever, means operative to render said piston effective, at one time, immediately upon movement out of release position, means operative to delay the effectiveness of said piston, at another time, until said piston has moved out of release position a chosen distance, and means for providing the same fluid pressure receiving volume at the pressure side of said piston when the first mentioned means controls the effectiveness of said piston as when the second mentioned means controls the effectiveness of said piston.

34. In a fluid pressure brake, the combination with a brake lever, of a push rod adapted to operate said lever to effect an application of the brakes, a brake cylinder piston having a release position and movable therefrom by fluid under pressure for applying braking force through said push rod to said lever, means operative to render said piston effective, at one time, immediately upon movement out of release position, means operative to delay the effectiveness of said piston, at another time, until said piston has moved out of release position a chosen distance, means for supplying fluid under pressure for operating said piston, and means for controlling the pressure of fluid obtained on said piston and operative to provide the same pressure on said piston, for a certain amount of fluid under pressure supplied thereto, when the first mentioned means controls the effectiveness of said piston as when the second mentioned means controls the effectiveness of said piston.

35. In a fluid pressure brake, the combination with a brake lever, of a push rod adapted to operate said lever to effect an application of the brakes, a brake cylinder piston having a release position and movable therefrom by fluid under pressure for applying braking force through said push rod to said lever, fluid pressure controlled means adapted to control the effectiveness of said piston to apply braking force through said push rod to said lever and operative to render said piston effective, at one time, immediately upon movement out of release position and operative at another time to delay the effectiveness of said piston until said piston has moved away from release position a chosen distance, and means controlled by the load on the car for selecting the operation of said fluid pressure controlled means.

36. In a fluid pressure brake, the combination with a brake lever, of a push rod adapted to operate said lever to effect an application of the brakes, a brake cylinder piston having a release position and movable therefrom by fluid under pressure for applying braking force through said push rod to said lever, fluid pressure controlled means for varying the distance from release position at which said piston becomes effective to apply braking force to said push rod and thereby to said lever, and means automatically adjusted according to the load on the car for controlling the operation of said fluid pressure controlled means.

37. In a fluid pressure brake, the combination with a brake lever, of a push rod adapted to operate said lever to effect an application of the brakes, a brake cylinder piston having a release position and movable therefrom by fluid under pressure for applying braking force through said push rod to said lever, means for varying the distance from release position at which said piston becomes effective to apply braking force to said push rod and thereby to said lever, and means operative according to the load on the car for controlling the operation of said means.

38. In a fluid pressure brake, in combination, one brake cylinder piston operative by fluid under pressure to effect an application of the brakes, another brake cylinder piston adapted to be operated by fluid under pressure for augmenting the degree of said application of brakes, control means for cutting the second mentioned brake cylinder piston either in for action or for cutting it out so as to render it inoperative, regulating means for rendering the first mentioned brake cylinder piston immediately effective when the second mentioned brake cylinder piston is cut in for action and for delaying the effectiveness of the first mentioned piston, when the second mentioned brake cylinder piston is cut out, until after movement of the first mentioned brake cylinder piston has created a volume substantially equal to that created by the second mentioned piston when operated by fluid under pressure, and means operable to adjust said control means and said regulating means in accordance with the load on the car.

39. In a fluid pressure brake system, the combination with more than two brake cylinders, of valve means adjustable to at least three positions corresponding to various degrees of load on the car and operative in one of said positions to cut one of said brake cylinders in for action, and operative in another of said positions to cut two of said brake cylinders in for action and operative in a third position for cutting three of said brake cylinders in for action, and means operative automatically for adjusting said valve means to one or another of said positions according to the load on the car.

40. In a fluid pressure brake, the combination with a brake lever, of a push rod for operating said lever, a brake cylinder piston operative by fluid under pressure to apply braking force to said rod, a clutch for operatively connecting said piston with said rod, a member operative in the release position of said piston for rendering said clutch ineffective and operative after a predetermined relative movement of said piston to permit said clutch to become effective, and means for moving said member with said piston a predetermined distance from said release position for thereby delaying such relative movement.

41. In a fluid pressure brake, the combination with a brake lever, of a push rod for operating said lever, a brake cylinder piston operative by fluid under pressure to apply braking force to said rod, a clutch for operatively connecting said piston with said rod upon a predetermined movement of said piston relative to said rod, a member movable relative to said clutch to a position to render said clutch ineffective upon movement of said piston to release position, and means for maintaining said member in said position with respect to said clutch for a predetermined movement of said piston out of release position.

42. In a fluid pressure brake, in combination, a brake cylinder piston having a release position and adapted to be moved therefrom by fluid under pressure to effect an application of the brakes, another brake cylinder piston having a release position and adapted to be moved therefrom by fluid under pressure to augment the degree of said application of brakes, means having one position for rendering only the first mentioned brake cylinder piston operative and another position for rendering both brake cylinder pistons operative, and means operative when only the first mentioned piston is operative, to cause the first mentioned piston to move from release position a distance further than when both pistons are operative, sufficient to compensate for the displacement volume of the second mentioned piston when said second mentioned piston is operative.

43. In a vehicle brake system, in combination, a fluid pressure operated device associated with a brake lever of the brake system, valve means for controlling the operation of said device, holding means for mechanically holding said valve means against movement in at least one direction, and means controlled by the fluid under pressure supplied to charge the brake system for controlling operation of both said valve means and said holding means.

44. In a fluid pressure vehicle brake system, in combination, valve means for controlling the pre-conditioning of the brake system for empty or loaded vehicle braking, locking means for mechanically locking said valve means against movement in one direction, an element movable to determine the loaded condition of the vehicle, fluid pressure operated means for controlling the operation of both said locking means and said element, and a valve device subject to the fluid under pressure supplied to charge the brake system for controlling the supply of fluid under pressure to and its release from said fluid pressure operated means.

45. In a vehicle brake system, in combination, a fluid pressure operated device associated with a brake lever of the brake system, valve means for controlling the operation of said device, a control device having an element movable according to the loaded condition of the vehicle, and holding means associated with and controlled by the operation of said control device and being operable to mechanically hold said valve means against movement in one direction.

46. In a vehicle brake system, in combination, an operating cylinder associated with a brake lever of the brake system, and having a single pressure chamber, valve means for controlling the supply of fluid under pressure to and its release from said chamber, said valve means having a normal position in which said chamber is connected to the atmosphere and being movable to another position to establish a communication through which fluid under pressure is supplied to said chamber to vary the ultimate braking power of the system, and means controlled by both the pressure of fluid supplied to charge the brake system and the loaded condition of the vehicle for controlling movement of said valve means.

47. In a fluid pressure brake system, in combination, valve means for controlling the pre-conditioning of the brake system for empty or loaded vehicle braking, a movable abutment subject on one side to spring pressure and on the other side to fluid pressure in a chamber for controlling movement of said valve means, means including an element positionable according to the actual load condition of the vehicle for controlling movement of said abutment when fluid under pressure is supplied to said chamber, and means controlled by fluid under pressure supplied to charge the brake system for controlling supply of fluid under pressure to said chamber, and operable to cut off the supply to and to exhaust said chamber at a predetermined fluid pressure.

DORIS BROWN DEAN,
*Executrix of the Last Will and Testament of William E. Dean, Jr., Deceased.*